United States Patent
Scagliola et al.

(10) Patent No.: US 9,221,572 B2
(45) Date of Patent: Dec. 29, 2015

(54) METHOD AND DEVICE FOR THE CONTROLLED EMPTYING OF A TRANSPORT CONTAINER HOLDING PIECE GOODS

(75) Inventors: Andrea Scagliola, Ammerthal (DE); Torsten Tanz, Hilzingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 743 days.

(21) Appl. No.: 13/504,569

(22) PCT Filed: Oct. 22, 2010

(86) PCT No.: PCT/EP2010/065990
§ 371 (c)(1),
(2), (4) Date: May 22, 2012

(87) PCT Pub. No.: WO2011/051189
PCT Pub. Date: May 5, 2011

(65) Prior Publication Data
US 2012/0224939 A1    Sep. 6, 2012

(30) Foreign Application Priority Data

Oct. 27, 2009 (DE) .......................... 10 2009 050 901

(51) Int. Cl.
*B65B 21/02* (2006.01)
*B65B 69/00* (2006.01)
*B07C 1/04* (2006.01)
*B65G 65/23* (2006.01)

(52) U.S. Cl.
CPC .. *B65B 69/00* (2013.01); *B07C 1/04* (2013.01); *B65G 65/23* (2013.01)

(58) Field of Classification Search
CPC ......................................................... B65G 1/00
USPC .................................................. 414/425, 810
See application file for complete search history.

(56) References Cited

U.S. PATENT DOCUMENTS

| 6,190,110 B1 | 2/2001 | Stanley et al. |
| 2001/0005688 A1 | 6/2001 | Carr et al. |
| 2007/0201970 A1 | 8/2007 | Liu et al. |

FOREIGN PATENT DOCUMENTS

FR              2 689 872 A1    10/1993

*Primary Examiner* — Saul Rodriguez
*Assistant Examiner* — Willie Berry, Jr.
(74) *Attorney, Agent, or Firm* — Laurence Greenberg; Werner Stemer; Ralph Locher

(57) ABSTRACT

A method and a device for the automated emptying of packets and packages or similar piece goods from a collection or transport container holding the piece goods. The container is pivotable to this end by way of a tipping device at least temporarily holding the container, according to a defined motion schema, into an emptying position. In order to provide an effective, automated solution for gently emptying packets and packages or similar piece goods from collection or transport containers, allowing for simultaneous minimizing of the damage occurring at low cycle times, the collection or transport container is tipped out, wherein the motion schema and thus the tipping procedure of the collection or transport container can be accelerated or decelerated as a function of the current emptying procedure and/or considering the speed and/or amount of the tipped-out piece goods.

6 Claims, 1 Drawing Sheet

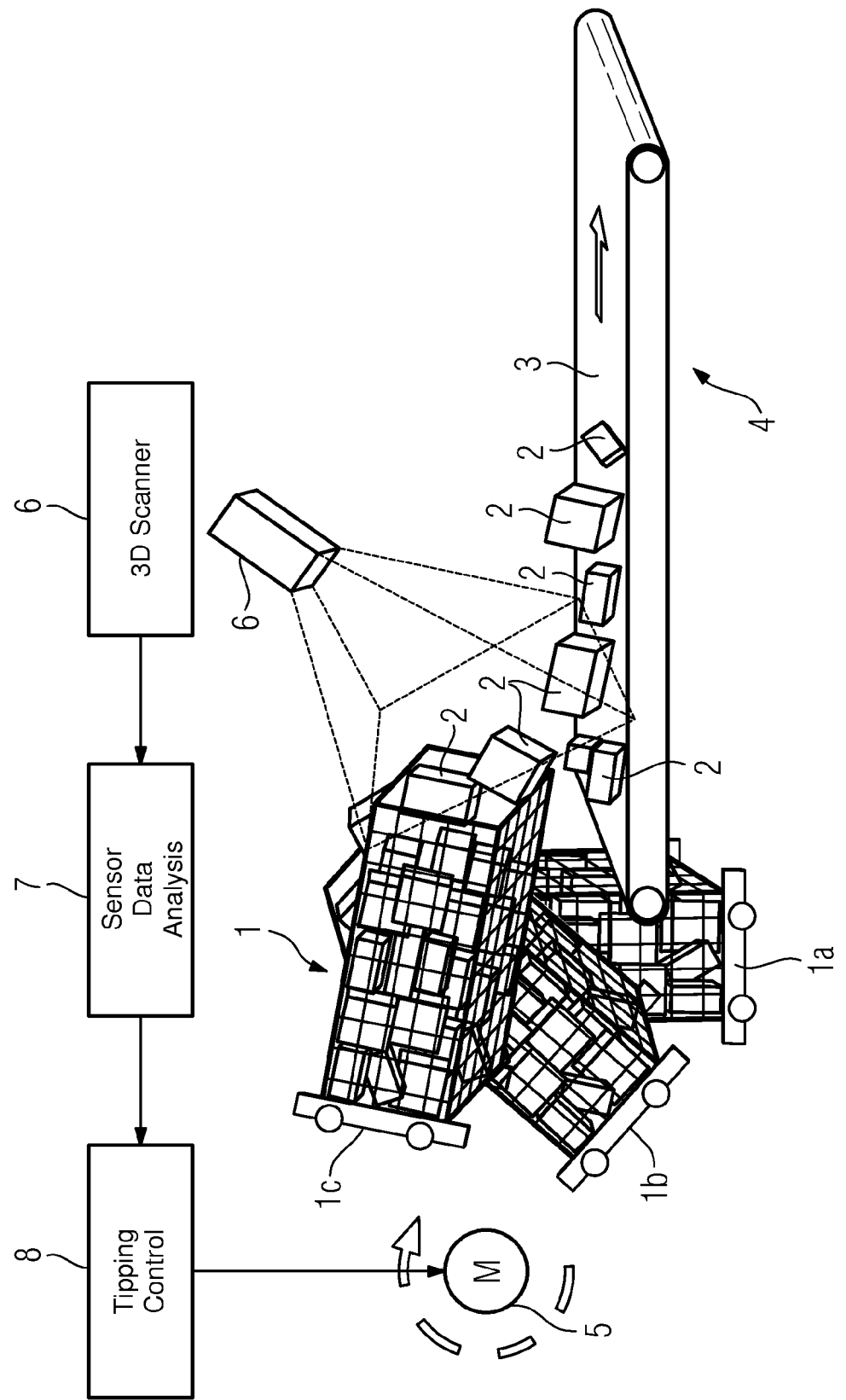

METHOD AND DEVICE FOR THE CONTROLLED EMPTYING OF A TRANSPORT CONTAINER HOLDING PIECE GOODS

BACKGROUND OF THE INVENTION

Field of the Invention

The invention relates to a method and to a device for the automated emptying of packets and packages or similar piece goods from a collection or transport container holding the piece goods, said container being pivotable to this end by means of a tipping device at least temporarily holding the container, according to a defined motion schema, into an emptying position.

Packet services (for example DHL) transport packets and packages for short distances stacked in collection or transport containers, such as rolling containers or similar loading units, in which the packets are advantageously loosely stacked. Removal of the stacks takes place manually or in a partially automated manner; customarily, the packets removed from the collection or transport container are fed onto conveyor belts individually or in a pulk for forwarding to subsequent sorting or singulating technologies. Although methods in which the collection or transport containers are tipped out in a mechanized manner frequently result in greater rates of damage of the goods being transported, said methods are more effective in view of the shorter cycle times.

The automatic emptying of containers by "tipping out" taking place in accordance with a predefined, fixed motion schema is known. An internally known prior art proposes using an automated device for tipping loading units, such as rolling containers or the like, in which the loading unit is moved with an open side wall toward a vertically oriented wall surface which, together with the loading unit bearing thereagainst, is movable into a horizontal or approximately horizontally inclined position from which only the loading unit is movable back into the upright position thereof. The piece goods, packets or packages remain, stacked to a greater or lesser degree, on the wall surface, which is now horizontal, and are discharged from there by conveyor technology and, in the process, singulated.

With the known proposal, although the dynamic forces occurring during the tipping procedure are divided and reduced because the transfer onto and together with the inclined wall surface means that only isolated forces act on the packets or piece goods, it is disadvantageous that, before singulation takes place, the entire contents of the loading unit are dumped on the removal device. In contrast to manual unloading, in which the packets are already placed individually onto the removal device, the known device requires more space and is not effective with regard to the unloading capacity.

BRIEF SUMMARY OF THE INVENTION

It is the object of the present invention to provide an effective automated solution for gently emptying packets and packages or similar piece goods from collection or transport containers, at the same time permitting minimization of the damage occurring and low cycle times.

In order to achieve the object, it is proposed according to the invention that the collection or transport container is tipped out, wherein the motion schema and thus the tipping procedure of the collection or transport container can be accelerated or decelerated as a function of the current emptying procedure and/or taking into consideration the speed and/or amount of the tipped-out piece goods.

The basic concept of the invention consists in no longer emptying out piece goods as a whole or in an uncontrolled and unbraked manner from the collection or transport container onto a stack; instead, the piece goods, for example packets, are emptied individually or in small amounts and successively as gently as possible from the collection or transport container. This minimizes damage to the piece goods, since heavy packets are no longer, as previously, ejected in an uncontrolled manner onto stacks of lighter packets.

According to a configuring feature of the invention, it is proposed that the current emptying procedure is detected by a preferably multi-dimensional sensor and is evaluated in a sensor data analysis coupled to the controller of the drive of the tipping device for the collection or transport container. According to the invention, the sensor controls the unloading procedure and the ejection of the piece goods during the tipping procedure of the container and intervenes in the controller of the drive of the tipping drive if too many or too few piece goods have been ejected from the collection or transport container. As a result, not only are the piece goods protected; a pre-singulating of the piece goods supplied, for example, to a sorter takes place even as the collection or transport container is being emptied out.

The current emptying procedure of the container is preferably detected by means of a known image recognition sensor or a 3D scanner. On the basis of the obtained information, after the information has been evaluated in a computer, the number and/or the speed of the piece goods leaving the collection or transport container is/are controlled by deceleration or acceleration of the tipping procedure. If too many piece goods drop, the collection or transport container or the tipping device is tipped back in the direction of the starting position thereof, and if too few piece goods are emptied, the collection or transport container is tipped further forward in the direction of the removal device such that more piece goods can drop out of the collection or transport container. If the packets which have dropped out can be removed immediately, it is also ensured that the piece goods cannot drop onto one another and be damaged.

If, according to another proposal of the invention, the complete emptying of the collection or transport container is detected by means of the sensor, the pivoting procedure of the tipping device can be initiated in the starting state of the container.

According to the invention, a collection or transport container holding the piece goods is designed as a skeleton container, the contents of which, consisting of packets and packages of similar mail items, can be tipped out onto a removal device before or within a singulating device and/or a sorter. The removal device may preferably be designed as a belt conveyor; it is also conceivable to tip the piece goods out directly into a singulating device or onto a sorter.

With the invention, use is made for the first time of a sensor-controlled control circuit for a device of this type, with which minimization of the damage to the piece goods and a simultaneous reduction in the cycle times can be anticipated.

BRIEF DESCRIPTION OF THE DRAWING

The FIGURE is a schematic diagram of a device for carrying out the method of the invention.

DESCRIPTION OF THE INVENTION

A device according to the invention for carrying out the method is illustrated in the drawing and is described below.

The drawing shows a collection or transport container in the form of a rolling container 1, in which a large number of packets and packages 2 is stacked. The rolling container 1 is positioned and held in a tipping device—not illustrated—upstream of a belt conveyor 3 of a removal device 4. In order to initiate the tipping procedure, the rolling container 1 is pivoted from the position 1*a* via the position 1*b* into the position 1*c* or into any intermediate position, for which purpose the tipping device is driven by a motor, as symbolized at 5. A 3D scanner 6 detects the packets 2 which have been ejected from the rolling container 1 and initiates a sensor data analysis 7. Depending on the identified situation, the tipping procedure of the rolling container 1 is accelerated or decelerated, controlled 8 via the motor drive 5 of the tipping device, in such a manner that neither too few nor too many packets 2 pass onto the removal device 4 at the same time.

The ejected packets 2 are transported away in the meantime by the belt conveyor 3 of the removal device 4 as soon as they have left the rolling container 1 and have passed onto the belt conveyor 3. As soon as the 3D scanner 6 via the sensor data analysis 7 has detected the complete emptying of the rolling container 1, the tipping device and therefore the rolling container 1 are pivoted back into the starting position 1*a* by motor 5. The rolling container 1 can now be removed and replaced within a short cycle by a new full rolling container 1.

The invention claimed is:

1. A method for the automated emptying of piece goods from a collection or transport container holding the piece goods, the method which comprises:
   temporarily holding the container with a tipping device and pivoting the container with the tipping device according to a defined motion schema into an emptying position during which the collection or transport container is tipped out;
   measuring with at least one sensor a progress of the current emptying process for determining a rate at which the piece goods drop out of the container; and
   selectively accelerating or decelerating the motion schema defining the tipping procedure of the collection or transport container in dependence on the current emptying process and/or taking into account a speed and/or an amount of tipped-out piece goods.

2. The method according to claim 1, wherein the piece goods are packets and packages.

3. The method according to claim 1, which comprises detecting the current emptying process by a sensor and evaluating the detected data in a sensor data analysis coupled to a controller of a drive of the tipping device.

4. The method according to claim 3, wherein the sensor is a multi-dimensional detection sensor.

5. The method according to claim 1, which comprises detecting the current emptying process of the collection or transport container by an image recognition sensor or a 3D scanner, and, after evaluating the information obtained in a computer, controlling a number of piece goods leaving the collection or transport container by selectively decelerating or accelerating the tipping procedure.

6. The method according to claim 1, which comprises detecting a complete emptying of the collection or transport container by way of a sensor systems that initiates the pivoting procedure of the tipping device in a starting state of the collection or transport container.

\* \* \* \* \*